W. ROBINSON.
Electric Apparatus for Operating Gates.
No. 4,274. Reissued Feb. 21, 1871.
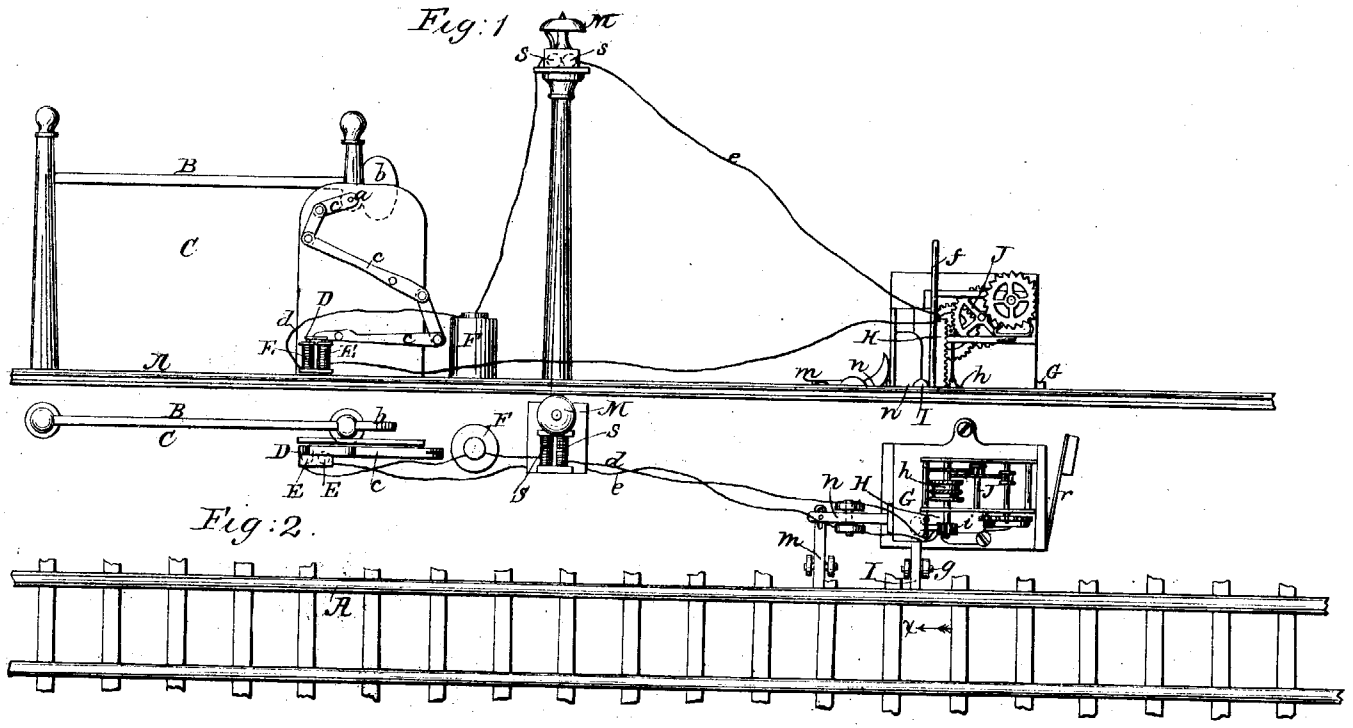
Witnesses.
Sydney O. Smith
A. D. Lee
Inventor
W. Robinson
by Attorneys
Brown, Coombs & Co
N. PETERS, Photo-Lithographer, Washington, D. C.

United States Patent Office.

WILLIAM ROBINSON, OF BROOKLYN, NEW YORK.

Letters Patent No. 105,494, dated July 19, 1870; antedated July 8, 1870; reissue No. 4,274, dated February 21, 1871.

IMPROVEMENT IN ELECTRO-MAGNETIC GATE-OPENING APPARATUS.

The Schedule referred to in these Letters Patent and making part of the same.

*To all whom it may concern:*

Be it known that I, WILLIAM ROBINSON, of Brooklyn, in the county of Kings and State of New York, have invented a new and useful Electro-Magnetic Apparatus for Operating Gates and Signals on Railroads and at other places, of which the following is a full, clear, and exact description, reference being had to the accompanying drawing forming a part of this specification, and in which Figure 1 represents a side elevation of an electro-magnetic gate and signal-operating apparatus as applied to a line of railway, and Figure 2, a plan of the same.

Similar letters of reference indicate corresponding parts in both figures.

My invention has for its object the opening or closing of gates and oporation of signals by vehicles from a distance, or as they approach the same, through the intervention of an electro-magnet or magnets, operating in connection with suitable mechanism on the gate or signal, and controlled, as regards the opening or closing of the circuit by the vehicle while in motion.

Said invention is applicable alike to the operating of what are termed approach-opening gates on farms and other domains.

Also, to the closing of gates or the operation of signals at crossings on a line of railroad or elsewhere.

It will suffice here, however, to describe the invention in connection with the last-mentioned instance of its application.

The invention consists in a combination of a circuit-closer to a battery, arranged so as to be controlled by the vehicle in motion, an electro-magnet or magnets in connection with said battery, and an armature acting through suitable mechanism or devices, to control or operate the gate or signal, accordingly as the circuit is broken or closed.

In this connection the invention comprises various combinations or arrangements of details, including a shifting circuit-closer or support thereto, and mechanical devices for moving the same, whereby the circuit-closer, or device used to control it by the passing vehicle, is automatically put into and out of position, for control thereof, according to the direction in travel of the vehicle, so that the gate or signal may be acted upon by either of two vehicles or trains passing in opposite directions, through separate apparatus of the character here referred to, arranged on opposite sides of the gate or signal, and the apparatus on the off-side of the latter shifted by the passing vehicle or train from any action on its circuit-closer, and, after the train or vehicle has passed, be returned to its working or normal position.

It also comprises a circuit-closer so constructed that when closed it will remain closed.

Referring to the accompanying drawing—

A represents a line of railroad, and

B, the gate of a crossing, C.

This gate is represented as pivoted at *a*, so as to open upward, and has a weight, *b*, on the off-side of its fulcrum operating to open the gate when the same is not kept closed by an armature, D, of or to an electro-magnet or magnets, E, acting through a lever or levers, *c*, on the gate, which latter may have connected with it a signal, or be constructed to operate as a signal, as well as or in addition to or independently of its ordinary function as a gate.

F is a battery, the opposite poles of which are connected by wires, *d e*, with the magnets, E, and said wires arranged at their opposite ends to project one above the other through an insulating-support, *f*, erected on a frame, G, which carries the circuit-closer, and which may be situated a quarter of a mile, more or less, from the gate B.

The circuit-closer, which may be of any suitable construction, is here represented as consisting of a vertical rack, H, which, when down, breaks the circuit; but is so arranged as that, when raised, it passes over or is in contact with the projecting ends of the wires *d e*, thus closing the circuit and causing the magnets E through the armature D and levers *c* to shut the gate and keep it closed.

On the breaking of the circuit the weight *b* lifts or opens the gate.

The circuit-closer is operated to close the circuit, and, through the electro-magnets, the gate B, by a lever, I, pivoted as at *g*, and arranged so that the wheel, or any suitable appendage from a locomotive or train, when traveling in the direction of the arrow *x*, will bear down upon it and lift the rack into contact with the ends of the wires *d e*, and some little distance beyond mere contact, so that the rack in falling again after the train has passed, will remain or operate for a sufficient length of time to secure the gate being kept closed till after the train has passed the crossing.

This is or may be effected, and a slow, steady, falling of the rack be secured through the descent of a weight, *h*, previously raised by clock-work, J, operated through a pinion, *i*, by the rack in being lifted.

Thus it will be seen that an automatic closing action of the gate is secured by the locomotive or train through the agency of electro-magnetism in advance of arrival at the crossing, and that the gate is kept closed till the train has passed the latter, when it is automatically opened again.

To provide for the closing of the gate by a train coming in the opposite direction, a similar electro-magnetic apparatus to that described should be arranged in advance of the crossing beyond or on the other side of the gate, and it may be on the opposite side of the track, and both of such apparatus, or their circuit-closers, be so constructed or arranged as to admit of them, or either one of them that lies on the off-side of the gate, and which is determined by the direction in travel of the train, being shifted out of working position by the train as it passes it after having traversed the crossing, it only being necessary that either apparatus should be set going as the train approaches the crossing.

This may be effected by pivoting, as at *k*, the frame G that carries the circuit-closer and combining with the same levers *m n* arranged so that the wheels of the vehicle or cars in the train will, by the direction of travel, first come in contact with the lever *m* and depress it, and, through the action of the lever *n*, swing the frame G so that its lever I, which operates the circuit-closer, will be put out of reach or contact by the passing train; but after the train has passed the apparatus the same is shifted back to its normal position by the action of a weight or spring, *r*, on the frame G, and whereby the lever I is returned to its original position for operation of the circuit-closer by a train coming in the reverse direction and in which the lever I is struck or acted upon before the lever *m*.

Connected with the apparatus for operation in concert with the gate, or independently of it, may be electro-magnets, *s s*, that, when the circuit-closer H has closed the circuit, may, by means of said closer, or through the intervention of a suitable independent circuit-closer, be made to strike in repeated succession an audible alarm or bell, M, to give notice of the approach or passage of a train.

What is here claimed, and desired to be secured by Letters Patent, is—

1. The arrangement of the lever I, for operation by the wheels of a passing vehicle or train, and relatively to the circuit-closer of an electro-magnet apparatus, that the wheels depressing said lever will actuate the circuit-closer for operating a gate or signal, substantially as shown and described.

2. The combination of the lever or levers c, with the gate or signal B, and circuit-closer of a battery, arranged so as to operate the gate or signal by the action of the passing vehicle, substantially as specified.

3. The circuit-closer to the battery, so constructed that when the circuit is closed by the action of a moving vehicle or train, it will temporarily remain closed for a specified length of time, or until the vehicle or train has passed a certain distance beyond the point at which it closed the circuit, essentially as specified.

4. The combination of a bell or alarm, with a circuit-closer, constructed or arranged for prolonged action, and under control of a moving vehicle or train, substantially as herein described.

5. The combination, with a circuit-closer, arranged for operation by the vehicle while in motion, of clock-work for prolonging the action to said circuit-closer, and operating to keep the armature of the magnets in prolonged hold on or control of the gate or signal, substantially as specified.

6. The circuit-closer or its stand or frame, or a portion thereof, hung or arranged so as to be shifted out of working position by a vehicle or train passing in the one direction, and afterward returning to its normal position for control of the circuit-closer by a vehicle or train passing in the opposite direction, essentially as herein set forth.

WILLIAM ROBINSON.

Witnesses:
FRED. HAYNES,
R. E. RARBAU.